United States Patent [19]

Ueda

[11] Patent Number: 4,824,236
[45] Date of Patent: Apr. 25, 1989

[54] ZOOM LENS SYSTEM FOR USE IN MICROFILM PROJECTION APPARATUS

[75] Inventor: Toshihiko Ueda, Toyokawa, Japan

[73] Assignee: Minolta Camera Kabushiki Kaisha, Osaka, Japan

[21] Appl. No.: 35,037

[22] Filed: Apr. 6, 1987

[30] Foreign Application Priority Data

Apr. 8, 1986 [JP] Japan .................................. 61-80748

[51] Int. Cl.⁴ .......................... G02B 15/14; G02B 9/64
[52] U.S. Cl. ............................. 350/427; 250/214 AL; 350/449
[58] Field of Search .............................. 350/427, 449; 250/214 AL

[56] References Cited

U.S. PATENT DOCUMENTS

| | | |
|---|---|---|
| 3,360,325 | 12/1967 | Gustafson . |
| 4,449,791 | 5/1984 | Terasawa et al. .................... 350/427 |
| 4,620,775 | 11/1986 | Fujioka ................................ 350/449 |

FOREIGN PATENT DOCUMENTS

| | | |
|---|---|---|
| 47-35028 | 9/1972 | Japan . |
| 57-4016 | 1/1982 | Japan . |
| 57-73715 | 5/1982 | Japan . |

Primary Examiner—John K. Corbin
Assistant Examiner—Rebecca D. Gass
Attorney, Agent, or Firm—Price, Gess & Ubell

[57] ABSTRACT

A zoom lens system for use in microfilm projection apparatus in which the image projection is conducted in a condition of a definite object-image distance, the system comprising from the enlargement side to the reduction side, an aperture stop disposed fixedly, a first lens group of a positive refractive power located near the aperture stop at the longest focal length side, a second lens group of a negative refractive power, and a third lens group of a positive refractive power, wherein the first to third lens groups are moved along the optical axis while increasing a distance between the first and second lens groups and decreasing a distance between the second and third lens groups in an operation of zooming from the longest focal length side to the shortest focal length side.

12 Claims, 5 Drawing Sheets

SPHERICAL ABERRATION

ASTIGMATISM

DISTORTION

SPHERICAL ABERRATION

ASTIGMATISM

DISTORTION

FIG. 7a
FIG. 7b
FIG. 7c
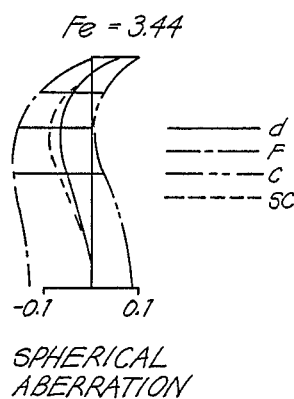
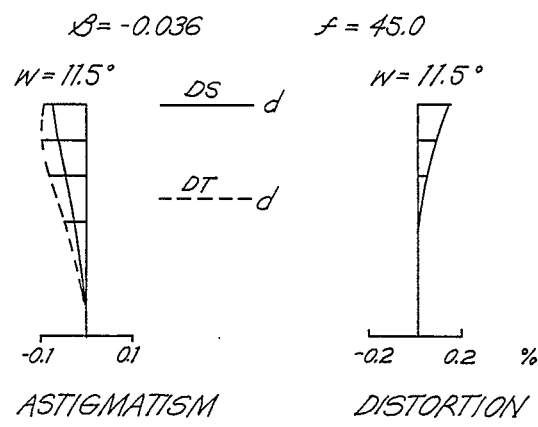
SPHERICAL ABERRATION
ASTIGMATISM
DISTORTION
FIG. 8a
FIG. 8b
FIG. 8c
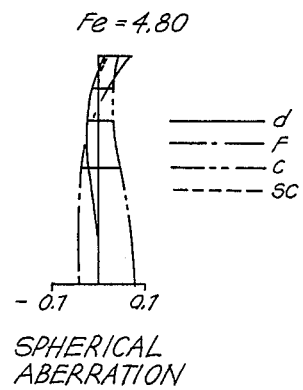
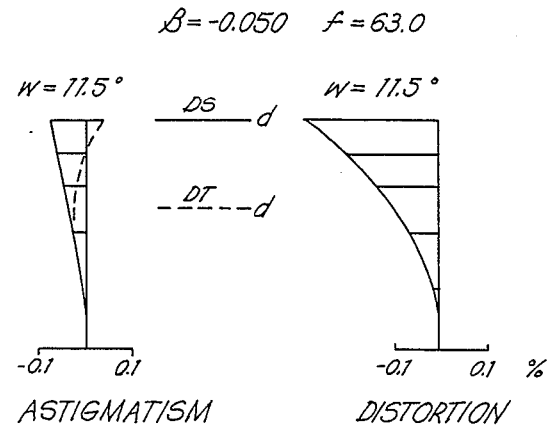
SPHERICAL ABERRATION
ASTIGMATISM
DISTORTION

SPHERICAL ABERRATION

ASTIGMATISM

DISTORTION

SPHERICAL ABERRATION

ASTIGMATISM

DISTORTION

ZOOM LENS SYSTEM FOR USE IN MICROFILM PROJECTION APPARATUS

FIELD OF THE INVENTION

The present invention relates to a zoom lens system for use in a microfilm projection apparatus such as microfilm readers, microfilm reader/printers and the like, and more particularly to a zoom lens system for projecting images of microfilms in a range of 20x to 28x at a definite object-image distance.

One example of a microfilm reader is shown in FIG. 1. The image on the microfilm M, sandwiched between flat glass plates G, is projected onto a screen 7 via a lens system 2, an image rotation prism 3 and mirrors 4, 5, 6. The rotation of the prism 3 rotates the image on the screen 7 without moving the film M.

In the conventional microfilm projection apparatus as shown in FIG. 1, there is used lens systems having constant magnification. If an user wishes to project the images at another magnification, it is necessary for the user to change the presently used lens system to another lens system having another magnification. Change of the lens are troublesome work for the user. Therefore, a zoom lens system is proposed for use in a microfilm projection apparatus.

One proposal is shown in Japanese Laid-Open Patent Application No. 57-73715 which discloses a zoom lens system having first, second and third lens groups and an aperture stop disposed between the second and third lens groups. This lens system has a drawback in that the light amount varies on a projection surface, that is, a screen surface is altered largely according to the zooming operation, so that the user has disagreeable feeling. The above mentioned drawback will be explained in more detail referring to FIG. 2 which shows a model of a lens system having a first lens group I and a second lens group II movable along an optical axis in the zooming operation, respectively, and an aperture stop disposed between the first and second lens groups. An effective F number of the enlargement side is determined by a size of an entrance pupil viewed from the enlargement side, namely, a size of a virtual image V of a stop S viewed through the first lens group I from the enlargement side. The effective F number is proportionally represented in a following equation:

$$1/2\sin U$$

where U is a half angle of spread of light flux of on-axis. Zooming movement of the first lens group I causes alteration of the effective F number since the half angle U and also the radius and position of the virtual image of the stop S are altered.

U.S. Pat. No. 3,360,325 discloses a zoom lens system having an image rotation prism therein. The image rotation prism, which is a Dove prism in this patent, causes aberrations to the whole lens system, so that it is necessary for the correction of the aberrations to increase the number of lenses. Furthermore, the zoom lens system of the U.S. Pat. has this same drawback as Japanese Laid-Open Patent Application No. 57-73715 since an aperture stop is disposed between movable lens groups.

SUMMARY OF THE INVENTION

Accordingly, an object of the present invention is to provide an improved zoom lens system for projecting images of microfilms at a definite object-image distance.

Another object of the present invention is to provide a zoom lens system capable of keeping an effective F number constant irrespective of zooming movement.

Still another object of the present invention is to provide a zoom lens system being compact and adapted to be an image rotation prism.

These and other objects of the present invention can be fulfilled by a zoom lens system for use in a microfilm projection apparatus, the system comprising from the enlargement side to the reduction side an aperture stop disposed fixedly, a first lens group of positive refractive power, a second lens group of negative prefractive power and a third lens group of positive refractive power, wherein the first to third lens groups are moved along an optical axis while increasing a distance between the first and second lens groups and decreasing a distance between the second and third lens group in the operation of zooming from the longest focal length side to the shortest focal lengh side.

More specifically, the first lens group includes, from the enlargement side, a positive lens element, a biconcave lens element and a positive lens unit having at least one positive lens element. The second lens group includes a positive lens unit having at least one positive lens element and a negative lens unit having at least one negative lens element. The third lens group is a compound lens unit composed of two lens elements cemented together.

The features of the present invention which are believed to be novel are set forth with particularity in the appended claims. The present invention, both as to its organization and advantages thereof, may best be understood by reference to the following description.

BRIEF DESCRIPTION OF THE DRAWINGS

FIGS. 7a to 7c are diagrams showing aberration curves of the first embodiments at −0.036x ;

FIGS. 8a to 8c are diagrams showing aberration curves of the second embodiments at −0.050x ;

DESCRIPTION OF THE PREFERRED EMBODIMENTS

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined herein specifically to provide a zoom lens system.

In the accompanying drawings which supplement the following tables, the lenses in accordance with the present invention are illustrated diagrammatically. The individual lenses are designated by the letter L with a subscript number (typed as an adscript number) corresponding to the consecutive numbers of the lenses from the enlargement side to the reduction side. The radii of curvature of the lenses are indicated by r, with a subscript (abscript number) corresponding to consecutive numbers of the lenses. The axial distances, d, along the optical axis are set forth in the tables and include both the axial spacings between the lenses and the thickness of the lenses. Finally, the refractive index, N, and Abbe number, $\nu$, are provided in each of the tables.

Figure 1:
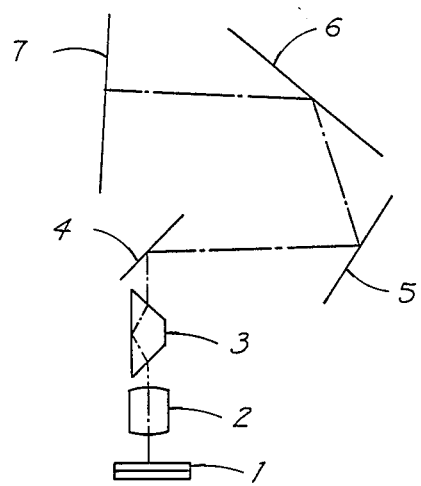
FIG. 1 is a diagram showing a microfilm reader having an image rotation prism.
Figure 2:
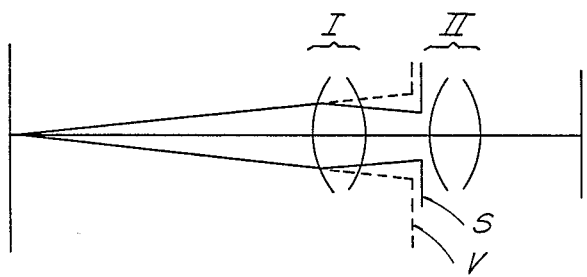
FIG. 2 is a schematic view for showing the model system used in the conventional apparatus.
Figure 3A:
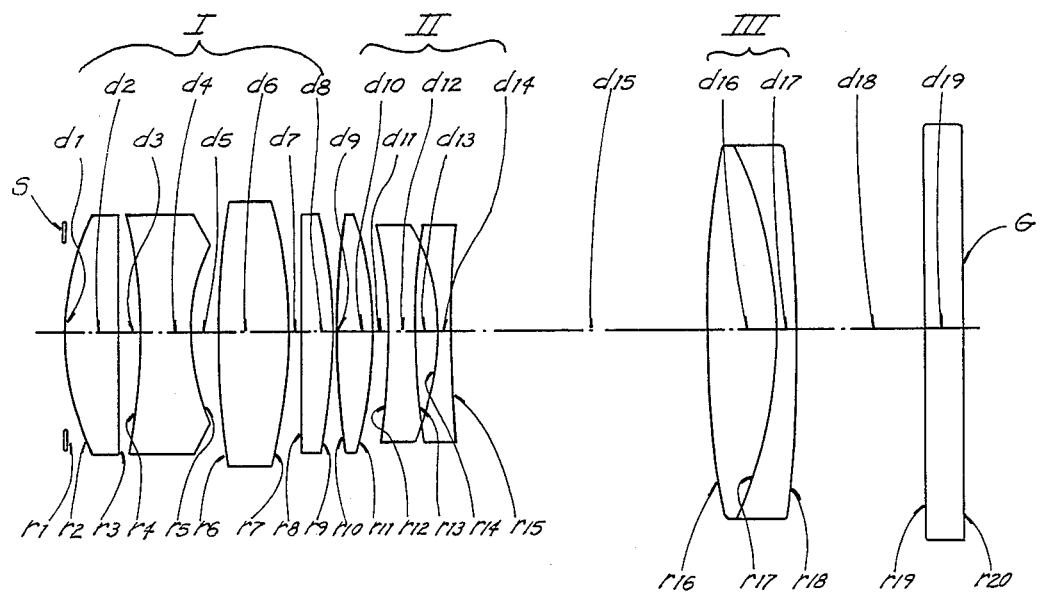
FIG. 3a is a diagram in section showing the zoom lens system of the first and second embodiments in the longest focal strength side.

Referring to FIG. 3a, the zoom lens system of the present invention comprises an aperture stop S fixedly disposed at the enlargement side (the screen side) and first to third lens groups I, II and III aligned in order and is constituted so as to filfull $$TL/f1 > 1.2$$

where TL is a distance between the aperture stop and the image surface and f1 is the longest focal length.

The first to third lens groups are moved along the optical axis independently so as to vary magnifications while keeping the object-image distance constant. More specifically, the first to third lens groups are moved while increasing a distance d9 and decreasing a distance d15 during zooming from the longest focal length side to the shortest focal length side.

The first lens group I is of a positive refractive power and comprises from the enlargement side a positive lens L1, a biconcave lens L2 and a positive lens unit (L3 and L4) having at least one positive lens. That is to say, the first lens group is a triplet type of posi-nega-posi or a modification thereof which is suitable for the correction of spherical aberration and coma if coordinated with a front or enlargement side stop.

The second lens groups II is of a negative refractive power and comprises, from the enlargement side, a positive lens unit (L5) having at least one positive lens and a negative lens unit (L6 and L7) having at least one negative lens. The second lens group contributes to the correction of any aberrations, especially astigmatism and coma of off-axis at zooming.

The third lens group III is of a positive refractive power and comprises a compound lens composed of a positive lens L8 and a negative lens L9 cemented together. The third lens group III is moved so that an entrance point of the off-axis principle ray becomes large in a coordinate perpendicular to the optical axis, to thereby effect the correction of lateral chromatic aberration.

Figure 4:
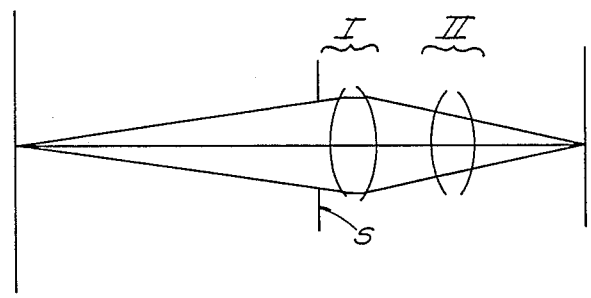
FIG. 4 is a schmatic view for showing the model system of the present invention as compared with the model system of FIG. 2.
Figure 5A:
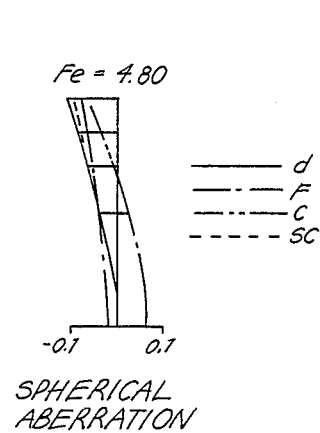
FIGS. 5a to 5c are diagrams showing aberration curves of the first embodiments at −0.050x.
Figure 5B:
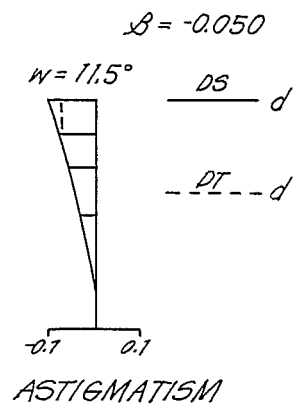
Figure 5C:
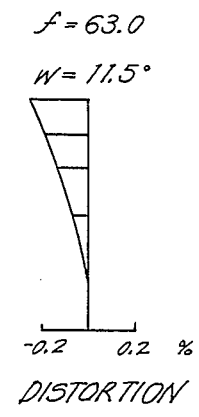
Figure 6A:
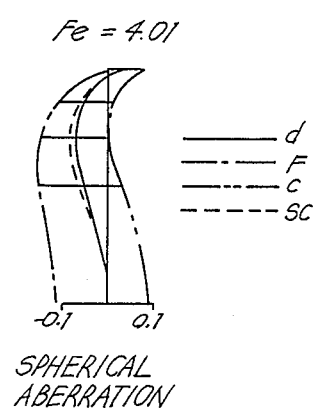
FIGS. 6a to 6c are diagrams showing aberration curves of the first embodiments at −0.042x.
Figure 6B:
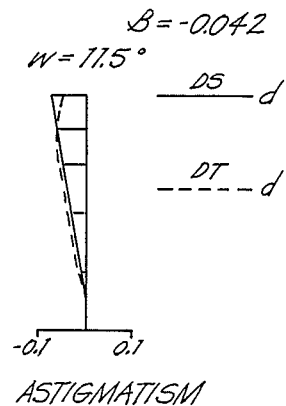
Figure 6C:
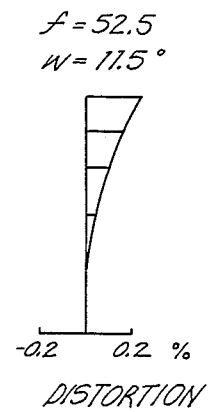
Figure 9A:
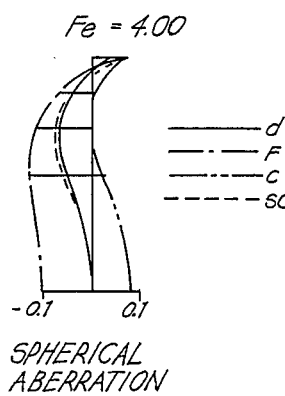
FIGS. 9a to 9c are diagrams showing aberration curves of the second embodiments at −0.042x.
Figure 9B:
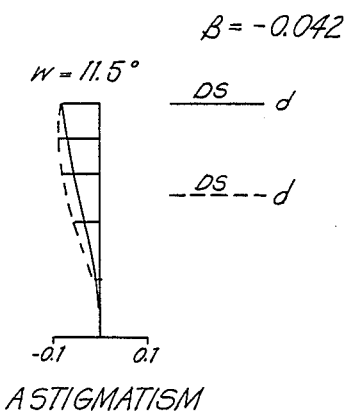
Figure 9C:
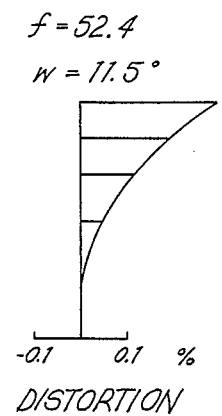
Figure 10A:
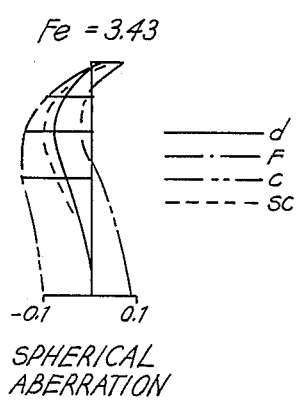
FIGS. 10a to 10c are diagrams showing aberration curves of the second embodiments at −0.036x.
Figure 10B:
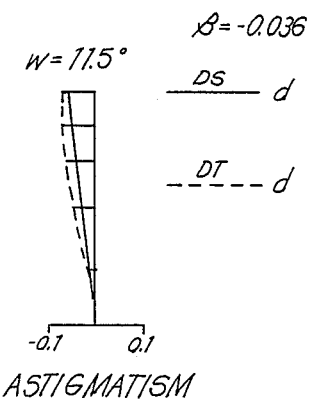
Figure 10C:
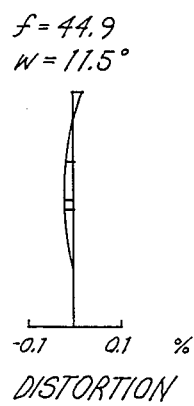

Referring to FIG. 4, a zoom lens system having a stop S at the most enlargement side keeps the effective F number constant, so that a light amount on the screen is kept constant. Additionally, a system with the stop disposed in front or on the enlargement side can combine with an image rotation prism of a compact size.

Figure 3B:
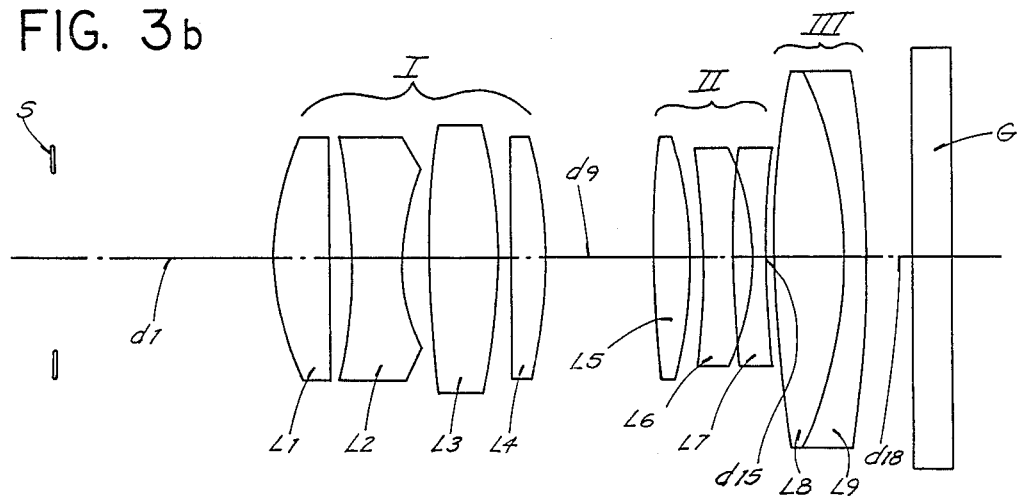
FIG. 3b is a diagram in section showing the zoom lens system of the first and second embodiments in the shortest focal length side.

The following tables 1 and 2 disclose, respectively, the first and second embodiments of the present invention which have the same configuration as shown in FIG. 3 but different numerical values. In the tables, r is the radius of curvature, d is the axial distance which includes three set of values corresponding to the magnification $-0.050x$, $-0.042x$, $-0.036$, respectively, N is the refractive index and $\nu$ is the Abbe number.

TABLE 1 effective F number of enlargement side: 96.0 (const)
effective F number of reduction side: 4.8 (f = 63 mm)
f = 63.0 to 52.5 to 45.0

| radius of curvature | | axial distance | | refractive index Nd | | Abbe number $\nu$d | |
|---|---|---|---|---|---|---|---|
| | | $\beta =$ | $-0.050 \sim -0.042 \sim -0.036$ | | | | |
| r1 | | | | | | | |
| | | d1 | $0.000 \sim 11.419 \sim 17.247$ | | | | |
| r2 | 20.068 | | | | | | |
| | | d2 | 4.143 | N1 | 1.76200 | $\nu$1 | 40.36 |
| r3 | 1858.770 | | | | | | |
| | | d3 | 1.516 | | | | |
| r4 | −45.650 | | | | | | |
| | | d4 | 4.081 | N2 | 1.75520 | $\nu$2 | 27.51 |
| r5 | 21.324 | | | | | | |
| | | d5 | 1.766 | | | | |
| r6 | 69.528 | | | | | | |
| | | d6 | 5.488 | N3 | 1.71700 | $\nu$3 | 47.86 |
| r7 | −42.026 | | | | | | |
| | | d7 | 0.895 | | | | |
| r8 | −294.949 | | | | | | |
| | | d8 | 2.420 | N4 | 1.74400 | $\nu$4 | 44.93 |
| r9 | −56.186 | | | | | | |
| | | d9 | $0.418 \sim 4.632 \sim 8.707$ | | | | |
| r10 | 65.236 | | | | | | |
| | | d10 | 2.496 | N5 | 1.75690 | $\nu$5 | 29.69 |
| r11 | −30.267 | | | | | | |
| | | d11 | 1.105 | | | | |
| r12 | −55.343 | | | | | | |
| | | d12 | 2.212 | N6 | 1.65446 | $\nu$6 | 33.86 |
| r13 | 65.071 | | | | | | |
| | | d13 | 1.614 | | | | |

TABLE 1-continued effective F number of enlargement side: 96.0 (const)
effective F number of reduction side: 4.8 (f = 63 mm)
f = 63.0 to 52.5 to 45.0

| | radius of curvature | | axial distance | refractive index Nd | | Abbe number νd |
|---|---|---|---|---|---|---|
| r14 | −18.248 | | | | | |
| | | d14 | 0.946 | N7 | 1.74000 ν7 | 31.72 |
| r15 | 66.099 | | | | | |
| | | d15 | 19.931~8.206~0.779 | | | |
| r16 | 86.008 | | | | | |
| | | d16 | 5.000 | N8 | 1.74400 ν8 | 44.93 |
| r17 | −30.416 | | | | | |
| | | d17 | 1.677 | N9 | 1.60342 ν9 | 38.01 |
| r18 | −120.876 | | | | | |
| | | d18 | 9.612~5.704~3.228 | | | |
| r19 | ∞ | | | | | |
| | | d19 | 3.000 | N10 | 1.51680 ν10 | 64.12 |
| r20 | ∞ | | | | | |
| | | Σd = | 68.302~68.302~68.302 | | | |

TABLE 2 effective F number of enlargement side: 96.0(const)
effective F number of reduction side: 4.8(f = 63 mm)
f = 63.0 to 52.4 to 44.9

| | radius of curvature | | axial distance | refractive index Nd | | Abbe number νd |
|---|---|---|---|---|---|---|
| r1 | | β = | −0.050~−0.042~−0.036 | | | |
| | | d1 | 0.500~11.411~16.648 | | | |
| r2 | 18.893 | | | | | |
| | | d2 | 4.100 | N1 | 1.76200 ν1 | 40.36 |
| r3 | 99.555 | | | | | |
| | | d3 | 1.500 | | | |
| r4 | −55.909 | | | | | |
| | | d4 | 4.800 | N2 | 1.75520 ν2 | 27.51 |
| r5 | 20.006 | | | | | |
| | | d5 | 1.800 | | | |
| r6 | 51.415 | | | | | |
| | | d6 | 2.600 | N3 | 1.74350 ν3 | 49.24 |
| r7 | −45.455 | | | | | |
| | | d7 | 0.900 | | | |
| r8 | −213.315 | | | | | |
| | | d8 | 2.600 | N4 | 1.78100 ν4 | 44.55 |
| r9 | −56.193 | | | | | |
| | | d9 | 1.800~6.580~11.189 | | | |
| r10 | 46.974 | | | | | |
| | | d10 | 3.200 | N5 | 1.75690 ν5 | 29.69 |
| r11 | −28.957 | | | | | |
| | | d11 | 1.200 | | | |
| r12 | −29.053 | | | | | |
| | | d12 | 1.000 | N6 | 1.65446 ν6 | 33.86 |
| r13 | 60.000 | | | | | |
| | | d13 | 2.000 | | | |
| r14 | −23.796 | | | | | |
| | | d14 | 1.100 | N7 | 1.74000 ν7 | 31.72 |
| r15 | 54.165 | | | | | |
| | | d15 | 21.500~9.731~2.347 | | | |
| r16 | 55.316 | | | | | |
| | | d16 | 6.500 | N8 | 1.74400 ν8 | 44.93 |
| r17 | −33.011 | | | | | |
| | | d17 | 1.700 | N9 | 1.60342 ν9 | 38.01 |
| r18 | −323.724 | | | | | |
| | | d18 | 8.425~4.502~2.040 | | | |
| r19 | ∞ | | | | | |
| | | d19 | 3.000 | N10 | 1.51680 ν10 | 64.12 |
| r20 | ∞ | | | | | |
| | | Σd = | 70.225~70.225~70.225 | | | |

What is claimed is:

1. A zoom lens system for use in a microfilm projection apparatus in which the image projection is conducted at a condition of a definite object-image distance, the system comprising from the enlargement side to the reduction side:

an aperture stop disposed fixedly;

a first lens group of a positive refractive power located near the aperture stop at the largest focal length side;

a second lens group of a negative refractive power; and a third lens group of a positive refractive power, wherein the first to third lens groups are moved along the optical axis all toward the shortest focal length side while increasing a distance between the first and second lens groups and decreasing a distance between the second and third lens groups in an operation of zooming from the longest focal length side to the shortest focal length side.

2. A zoom lens system as claimed in claim 1, wherein the first lens group includes, from the enlargement side, a positive lens element, a biconcave lens element and a positive lens unit having at least one positive lens element.

3. A zoom lens system as claimed in claim 1, wherein the second lens group includes, from the enlargement side, a positive lens unit having at least one positive lens element and a negative lens unit having at least one negative lens element.

4. A zoom lens system as claimed in claim 1, wherein the third lens group includes a compound lens unit composed of two lens elements cemented together.

5. A zoom lens system as claimed in claim 1, wherein the magnitification is varied between 20x and 28x in accordance with the zooming operation.

6. A zoom lens system as claimed in claim 1, wherein the second lens group includes, from the enlargement side, a positive lens unit having one positive lens element and a negative lens unit having one negative lens element.

7. A zoom lens system for use in a microfilm projection apparatus in which the image projection is conducted at a condition of a definite object-image distance, the system comprising from the enlargement side to the reduction side:
an aperture stop disposed fixedly;
a first lens group of a positive refractive power located near the aperture stop at the longest focal length side, the first lens group including, from the enlargement side, a positive lens element, a biconcave lens element and a positive lens unit having at least one positive lens element;
a second lens group of a negative refractive power, the second lens group including, from the enlargement side, a positive lens unit having at least one positive lens element and a negative lens unit haivng at least one negative lens element; and
a third lens group of a positive refractive power, the third lens group includes a compound lens unit composed of two lens elements cemented together.

8. A zoom lens system for use in a microfilm projection apparatus in which the image projection is conducted in a condition of a definite object-image distance at a range between 20x and 28x, the system comprising from the enlargement side to the reduction side:
an aperture stop disposed fixedly;
a first lens group of a positive refractive power located near the aperture stop at the longest focal length side, the first lens group including, from the enlargement side, a positive lens element, a biconcave lens element and a positive lens unit having at least one positive lens element;
a second lens group of a negative refractive power, the second lens group including, from the enlargement side, a positive lens unit having at least one positive lens element and a negative lens unit having at least one negative lens element; and
a third lens group of a positive refractive power, the third lens group includes a compound lens unit composed of two lens element cemented together;
wherein the first to third lens groups are moved along the optical axis while increasing a distance between the first and second lens groups and decreasing a distance between the second and third lens gropu in an operation of zooming from the longest focal length side to the shortest focal length side.

9. A zoom lens system for use in a microfilm projection apparatus in which the image projection is conducted at a condition of a definite object-image distance, the system comprising from the enlargement side to the reduction side:
an aperture stop disposed fixedly;
a first lens group of a positive refractive power located near the aperture stop at the longest focal length side, including from the enlargement side, a positive lens element, a biconcave lens element and a positive lens unit having at least one positive lens element;
a second lens group of a negative refractive power, and
a third lens group of a positive refractive power,
wherein the first to third lens groups are moved along the optical axis while increasing a distance between the first and second lens groups and decreasing a distance between the second and third lens groups in an operation of zooming from the longest focal length side to the shortest focal length side.

10. A zoom lens system as claimed in claim 9, wherein the second lens group includes, from the enlargement side, a positive lens unit having one positive lens element and a negative lens unit having one negative lens element.

11. A zoom lens system for use in a microfilm projection apparatus in which the image projection is conducted at a condition of a definite object-image distance, the system comprising from the enlargement side to the reduction side;
an aperture stop disposed fixedly;
a first lens group of a positive refractive power located near the aperture stop at the longest focal length side;
a second lens group of a negative refractive power, and
a third lens group of a positive refractive power including a compound lens unit composed of two lens elements cemented together,
wherein the first to third lens groups are moved along the optical axis while increasing a distance between the first and second lens groups and decreasing a distance between the second and third lens groups in an operation of zooming from the longest focal length side to the shortest focal length side.

12. A zoom lens system as claimed in claim 11, wherein the second lens group includes, from the enlargement side, a positive lens unit having one positive lens element and a negative lens unit having one negative lens element.

* * * * *